(12) United States Patent
Jeong

(10) Patent No.: US 9,237,757 B2
(45) Date of Patent: Jan. 19, 2016

(54) BANANA RIPENING

(71) Applicant: Chiquita Brands L.L.C., Charlotte, NC (US)

(72) Inventor: Jiwon Jeong, Ft. Lauderdale, FL (US)

(73) Assignee: CHIQUITA BRANDS, LLC, Charlotte, NC (US)

( * ) Notice: Subject to any disclaimer, the term of this patent is extended or adjusted under 35 U.S.C. 154(b) by 0 days.

(21) Appl. No.: 14/020,714

(22) Filed: Sep. 6, 2013

(65) Prior Publication Data

US 2014/0072682 A1    Mar. 13, 2014

Related U.S. Application Data

(60) Provisional application No. 61/698,460, filed on Sep. 7, 2012.

(51) Int. Cl.
   *A23B 4/16*     (2006.01)
   *A23B 7/152*    (2006.01)

(52) U.S. Cl.
   CPC ..................... *A23B 7/152* (2013.01)

(58) Field of Classification Search
   CPC ...................................... A23B 7/152
   USPC ............... 426/312, 112, 118, 418; 99/467
   See application file for complete search history.

(56) References Cited

U.S. PATENT DOCUMENTS

| | | | |
|---|---|---|---|
| 3,386,365 A | | 6/1968 | Jensen |
| 3,620,765 A | | 11/1971 | McDonnell et al. |
| 4,061,483 A | | 12/1977 | Burg |
| 4,764,389 A | * | 8/1988 | LaBarge ................. 426/312 |
| 5,460,841 A | | 10/1995 | Herdeman |
| 5,556,658 A | * | 9/1996 | Raudalus et al. ............ 426/411 |
| 5,658,607 A | * | 8/1997 | Herdeman ................. 426/263 |
| 5,899,084 A | | 5/1999 | Franaszek et al. |
| 6,077,160 A | | 6/2000 | Franaszek et al. |
| 7,883,810 B2 | | 2/2011 | Fagley et al. |
| 8,025,912 B2 | | 9/2011 | Forsyth et al. |
| 8,029,838 B2 | | 10/2011 | Forsyth et al. |
| 2002/0054969 A1 | * | 5/2002 | Clarke et al. ................ 428/35.2 |
| 2008/0008794 A1 | | 1/2008 | Forsyth et al. |

OTHER PUBLICATIONS

International Search Report and Written Opinion for International Application No. PCT/US2013/058633, mailed Feb. 7, 2014, 15 pages.

* cited by examiner

*Primary Examiner* — Preston Smith
(74) *Attorney, Agent, or Firm* — Kilpatrick Townsend & Stockton LLP

(57) ABSTRACT

The present invention provides methods and systems for accelerating the ripening of bananas to a color stage of 3.0 to 3.5. Also provided herein are bananas ripened according to the methods of the present invention.

17 Claims, 9 Drawing Sheets
(3 of 9 Drawing Sheet(s) Filed in Color)

Temperature of Air in Contact with Ripening Bananas

Increase/Decrease in [CO$_2$] in Air in Contact with Ripening Bananas

Increase/Decrease in [$O_2$] in Air in Contact with Ripening Bananas

BANANA RIPENING

CROSS REFERENCE TO RELATED APPLICATIONS

This application claims the benefit of U.S. Provisional Patent Application No. 61/698,460, filed Sep. 7, 2012, the entire disclosure of which is incorporated herein by reference.

BACKGROUND OF THE INVENTION

In order to meet the demands of a global food market, various technologies have been developed to faciliate the growth, harvest, transportation, and ripening of fruits such as, but not limited to, bananas. For example, see U.S. Pat. Nos. 8,029,838; 6,077,160; 5,460,841; 8,025,912; and 5,556,658, which set forth technologies related to banana technology.

However, there exists a problem in the field to which the instant invention pertains related to the speed at which bananas are ripened. There are perhaps perceived problems in this field related to the quality of the bananas that are ripened at a rate other than at a naturally occurring rate. Surprisingly, the present invention provides inventive solutions to these as well as many other problems.

BRIEF SUMMARY OF THE INVENTION

Elevating the temperature of hard-green bananas can accelerate the conversion of starch to sugar, in the banana, and result in a softened banana that is not suitable for commercial transport, storage, and sale. Prior to the instant invention, bananas were not ripened, as set forth herein, because it was thought that these conditions would render the bananas unsuitable for commercial transport, storage, and sale. Surprisingly, the present invention provides inventive solutions to these as well as many other problems. For example, the present invention provides methods of accelerating the ripening of bananas to particular brix percentages, firmness values, color stages, and combinations thereof, that are not achieved through natural ripening means or by means not set forth herein. By exposing bananas, as well as other fruits, to ethylene gas at the elevated temperature conditions set forth herein, bananas, as well as other fruits, can be ripened in a shorter amount of time than they would naturally ripen. The bananas ripened according to the inventive methods set forth herein to particular color stages are sweeter, have higher brix percentages, are firmer, have a lower tendency to soften, and, or, have a better commercial shelf-life as compared to a banana ripened to the same color stage either naturally or according to another method.

In one aspect, the present invention provides a method for accelerating the ripening of bananas to color stage 3.0 to 3.5. In this aspect, the ripening of hard green bananas to color stage 3.0 to 3.5 is accelerated by treating the hard green bananas with exogenous ethylene gas by exposing the bananas for about 12 to 36 hours to exogenous ethylene gas by contacting the bananas with air containing the ethylene gas. The average ethylene concentration in the treatment air is between about 150 parts per million to 600 parts per million. The treatment air temperature is maintained between about 70° F. (21° C.) to about 80° F. (27° C.) and the bananas are then ventilated with forced air at a temperature of about 50° F. (10° C.) to about 80° F. (27° C.) to help remove the exogenous ethylene. Subsequently, the bananas are next stored in air (without any added exogenous ethylene) at an air temperature of about 50° F. (10° C.) to about 60° F. (16° C.) for about 32 to 60 hours or until the bananas have reached a color stage of 3.0 to 3.5; during the storage the bananas are periodically ventilated to remove excess $CO_2$ and help maintain $O_2$ levels. This ventilation can also help remove any residual ethylene. Advantageously, the ripening method also surprisingly provides a means of obtaining bananas which are up to about 25% sweeter (e.g., at least about 10, 15, 20 or 25% sweeter (as measured by Brix), and/or up to about 25% firmer (e.g., at least about 5, 10, 15, or 20%) firmer (which can increase resistance to bruising), and/or have an improved texture, as compared to control bananas.

Bananas are usually harvested when they are unripe (green), and stored at a temperature of between 56° F. and 59° F. To activate the banana ripening process, the temperature is typically increased to between 60° F. and 62° F. and/or the composition of the gas medium surrounding the bananas is changed by adding ethylene to it. However, for the bananas to not ripen too quickly, or not spoil, the ripening process is usually conducted at a lower temperature. Surprisingly, the exposure of bananas to ethylene gas was found to be effective at higher temperatures of about 70° F. (21° C.) to about 80° F. (27° C.). Accordingly, the present ripening methods use ethylene exposure temperatures which are higher than the ethylene exposure temperatures used typically in ripening rooms.

In one embodiment of the above, the method includes the steps of 1) exposing hard green bananas for about 24 hours to exogenous ethylene gas by flowing air containing the exogenous ethylene gas over the surface of the bananas, wherein the averaged minimum ethylene concentration in the air is about 150 parts per million to an averaged maximum concentration of about 600 parts per million, and wherein the air is at a controlled air temperature of about 70° F. (21° C.) to about 80° F. (27° C.); 2) ending the exposing by ventilating the bananas with forced air at an air temperature of about 50° F. (10° C.) to about 80° F. (27° C.); 3) storing the bananas in air at an air temperature of about 50° F. (10° C.) to about 60° F. (16° C.) for about 24 hours or until the bananas have reached a color stage of 2.5 to 3.0; 4) ventilating the stored bananas with forced air at an air temperature of about 50° F. (10° C.) to about 80° F. (27° C.) to remove excess $CO_2$; and 5) storing the bananas in a controlled air temperature of about 50° F. (10° C.) to about 60° F. (16° C.) for about 24 hours or until the bananas have reached a color stage of 3.0 to 3.5.

In a second aspect, the present invention provides a system for accelerating the ripening of bananas to color stage 3.0 to 3.5. The system includes 1) a source of ethylene and an ethylene generator for exposing bananas to exogenous ethylene; 2) an air flow controller unit; 3) a thermostated heating or cooling device for maintaining a controlled air temperature about the bananas of about 50° F. (10° C.) to about 80° F. (27° C.) in the ripening room/chamber; 4) a humidifier for maintaining a controlled relative humidity in the ripening room/chamber atmosphere about the bananas of about 80% to about 100%; and 5) at least one vent.

In a third aspect, the present invention provides a system for accelerating the ripening of bananas to color stage 3.0 to 3.5. The system includes 1) a source of ethylene; 2) a means for exposing the bananas to ethylene in a ripening room; 3) a means for maintaining a static air pressure about the bananas of at least about 0.18 to about 0.22 inches of water; 4) a means for controlling the flow of air about the bananas; 5) a means for maintaining a controlled air temperature about the bananas of about 50° F. (10° C.) to about 80° F. (27° C.); 6) a means for maintaining a controlled relative humidity in the air about the bananas of about 80% to about 100%; and 7) a means for ventilating the ripening room.

In a fourth aspect, the present invention provides a banana ripened to color stage 3 to 3.5 according to a method set forth herein.

In a fifth aspect, the present invention provides a banana ripened to color stage 3.0 to 6.0, having a higher soluble solids content (Brix) as indicated by sugar content as compared to a naturally ripened banana of the same color stage.

In a sixth aspect, the present invention provides a method for improving sweetness and firmness in a banana. The method includes ripening a banana according to a ripening method set forth herein.

Reference will now be made in detail to particular embodiments of the invention, examples of which are set forth as illustrated figures and also empirical analyses.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

I. General

The present invention sets forth systems and methods for accelerating the ripening of fruits such as bananas. The systems and methods set forth herein include devices and steps for controlling the exposure of ethylene to bananas and properly storing and ventilating the bananas to particular color stages, as described herein.

II. Definitions

As used herein, the term "accelerating" refers to the process of bringing about something earlier in time than it otherwise would be. For example, the present invention accelerates the ripening of bananas in so far as the ripening process occurs earlier in time than it otherwise would for a naturally ripened banana.

As used herein, the term "about" refers to a number that is within 10% of the number qualified by the word about, including of course, the number itself. For example, about 50° F. includes 45° F., 50° F., and also 55° F. For example, about 40 Pa ($N/m^2$) includes 36 Pa, 40 Pa, and 44 Pa.

As used herein, the term "ripening" refers to the process for aging or maturing fruit, such as, but not limited to a banana. The process of ripening results in changes to the ripening fruit such as, but not limited to, color, sugar content, firmness, texture, size, water content, sweetness, and the ability to be stored and packaged without side effects such as, but not limited to, bruising, rotting, decaying, or molding.

Figure 1:
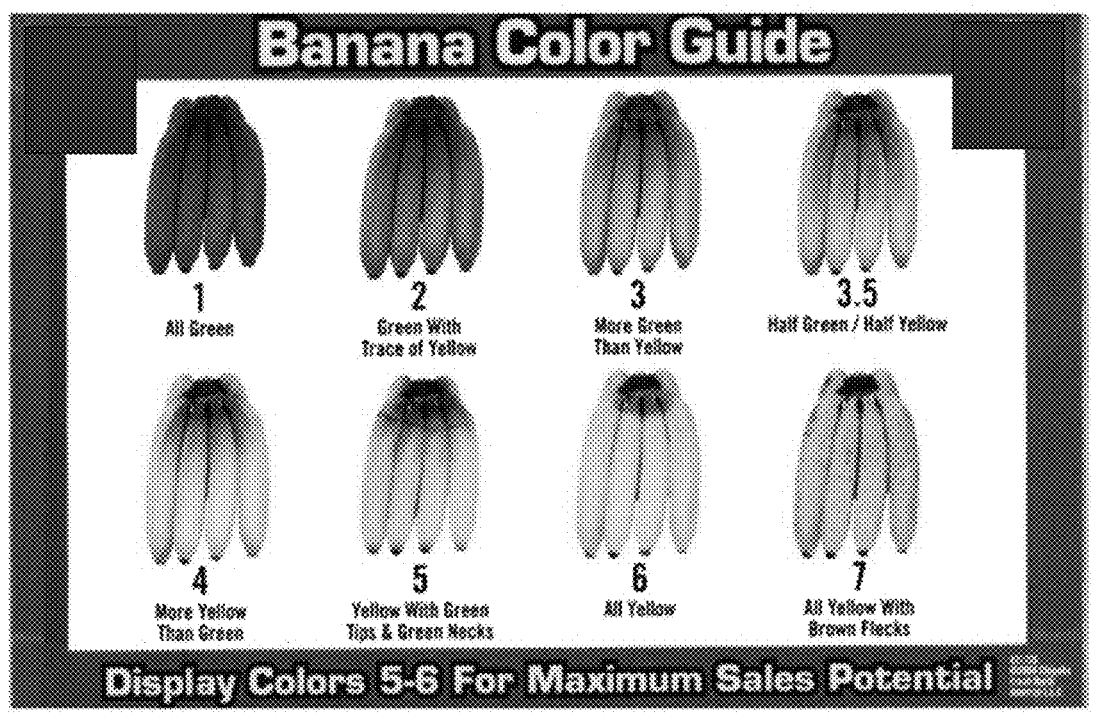
FIG. 1 shows a Banana Color Chart for determining a color stage of a banana.

As used herein, the term "color stage" refers to a stage of ripening of a banana as indicated by the exterior color and patterning of the banana. FIG. 1 shows a color stage indicator where the exterior color and patterning of bananas at particular stages of ripening are associated with particular color stage values.

As used herein, the term "ethylene" refers to the chemical compound $C_2H_4$. Ethylene can exist and be used, as set forth herein, as a liquid or a gas. Ethylene can be supplied by an ethylene generator. Exogenous ethylene refers to ethylene which is not produced by the fruit being ripened.

As used herein, the term "exposing" refers to the process of making a substance available to another substance. Exposing also means to bring two substances into contact with each other. Exposing bananas to ethylene means, for example, to make bananas available to ethylene so that the bananas can physically contact the ethylene.

As used herein, "maintaining" refers to keeping or sustaining a particular state or condition. Maintaining refers to the process wherein a condition, such as temperature or relative humidity, is held around a particular temperature. Maintaining a temperature also refers to the process whereby a range of temperatures, e.g. 50-60° C., is sustained. Maintaining a relative humidity also refers to the process whereby a range of humidity, e.g. 85-95%, is sustained.

As used herein, "controlling" refers to a process whereby a device actively maintains a state of condition. Controlling refers to a process that is not allowed to equilibrate on its own as without external input. For example, a controlled air temperature refers to an air temperature condition that is maintained by a device, such as, but not limited to, a thermostated heating or cooling device. A controlled air temperature refers to an air temperature that is different from the temperature the air would otherwise equilibrate to in the absence of the controlling device. A controlled relative humidity refers to a relative humidity that is different from what the humidity would otherwise equilibrate to in the absence of the controlling device. Examples of a controlled relative humidity refers to a relative humidity condition that is maintained by a device, such as, but not limited to, a humidifier.

As used herein, the term "ventilating" refers to the process whereby the ripening fruit is exposed to a different source of air, such as, but not limited to, outside air, forced air, compressed air, and air outside of the room in which the ripening is occurring. A room or enclosable space which includes vents for facilitating the ventilating are considered, herein, as ventable. In some instances, ventilating includes introducing a source of air that includes higher oxygen concentrations and lower carbon dioxide concentrations as compared to the air into which the introduced air is introduced. In some embodiments, the ventilating introduces ambient or outside air which has been cooled or heated to an indicated temperature.

As used herein, the phrase "averaged ethylene concentration" refers to the average air concentration, or percentage, of gaseous ethylene that is in contact with the ripening fruit. The concentration includes the exogenous ethylene gas and any released by the treated fruit. For example, in an enclosed ripening room, the averaged air ethylene concentration is the amount of ethylene in parts per million in the room air which is contacted with the ripening fruit. The averaged concentration is a time-weighted average for the specified time of contacting.

As used herein, the phrase "fan units" refers to devices which can force air to flow in a particular direction. Fan units typically includes blades or alternatively turbines for forcing air to flow in a particular direction. Fan units can be bladeless as well and may use electronic or magnetic means for forcing air to move or flow in a particular direction.

As used herein the phrase "plenum pressure structure" refers a structure which is useful for measuring or controlling the plenum pressure. The phrase "plenum pressure" refers to the air pressure in an air space, such as, but not limited to, the air space in a ripening room. The plenum pressure may also refer to the air pressure in immediate proximity to an air blower, an air compressor, or an air fan unit.

As used herein the phrase "forced air" refers to air which is forced to move in a particular direction. Devices useful for forcing air to move in a particular direction include air compressors, fan units, fans, blowers, air-conditioning units, compressed air tanks.

As used herein, the phrase "pressure gauge" refers to a gauge useful for measuring air pressure.

As used herein, the phrase "hard green bananas" refers to a state of bananas before being ripened according to the methods set forth herein. Hard green bananas are bananas that are not ripened more than color stage 1.

As used herein, the phrase "static pressure" refers to the pressure exerted by a liquid or gas and refers to the difference in pressure relative to the outside air pressure. In some embodiments, the static pressure is achieved by a negative pressure ventilation system.

As used herein, the term "banana" refers to the type of fruit commonly referred to as a banana. The types of bananas which are suitable for use with the present invention include, but are not limited to, baby, manzano, burro, plantain, red, apple banana, Cavendish, lady finger, pisang, williams, and cooking.

As used herein, the term "hybrid-banana" refers to a banana that is a product of cross breeding of different species of bananas or other fruits. Examples of hybrid bananas include, but are not limited to, hybrids of *Musa acuminata* and *Musa balbisiana*. Examples of hybrid bananas include, but are not limited to, bananas that are resistant to certain diseases, e.g. Panama disease.

III. Methods

The present invention provides methods for ripening bananas. The present invention also provides methods for accelerating the ripening of bananas. In certain embodiments, the invention provides a method for accelerating the ripening of hard green bananas to color stage 3.0 to 3.5, by first treating the bananas with exogenous ethylene gas by exposing the bananas for about 12 to 36 hours (e.g., about 14, 18, 20, 24, 28, 32 hours) to exogenous ethylene gas by contacting the bananas with air containing the ethylene gas. In some of such embodiments, the bananas are exposed to exogenous ethylene gas for about 20 to about 28 hours. In some embodiments, the bananas are exposed to exogenous ethylene gas for about 23, 24, or 25 hours. For such time periods, the average ethylene concentration in the treatment air is between about 150 parts per million to 600 parts per million (e.g., about 175, 200, 225, 250, 275, 300, 325, 350, 375, 400, 425, 450, 475, 500, 550 ppm), or between about 200 parts per million to about 400 parts per million; and, for any of the above conditions, any combinations thereof. In some embodiments, the average ethylene concentration in the treatment air is between about 100 parts per million to 300 parts per million, between about 150 parts per million to 350 parts per million, between about 200 parts per million to 400 parts per million, between about 250 parts per million to 450 parts per million, or between about 300 parts per million to 500 parts per million. When contacting the bananas with the ethylene gas, shorter or longer contact times may be used with higher or lower ethylene concentrations, respectively. The treatment air temperature is maintained between about 70° F. (21° C.) to about 80° F. (27° C.) (e.g., about 72, 74, 76, 78° F. or about 22, 23, 24, 25, 26° C.), or between about 72° F. (22° C.) to about 78° F. (26° C.). In some embodiments, the internal temperature of the ripening bananas is maintained between about 70° F. (21° C.) to about 80° F. (27° C.) (e.g., about 72, 74, 76, 78° F. or about 22, 23, 24, 25, 26° C.), or between about 72° F. (22° C.) to about 78° F. (26° C.). Next, the bananas are then ventilated with forced air at a temperature of about 50° F. (10° C.) to about 80° F. (27° C.) to help remove the exogenous ethylene (e.g., to reduce the concentration of exogenous, or optionally total, ethylene gas by at least 90, 91, 92, 93, 94, 95, 96, 97, 98, 99, 99.9, 99.99, 99.999%), or to a temperature of about 54° F. (12° C.) to about 70° F. (21° C.), or to a temperature of about 54° F. (12° C.) to about 60° F. (16° C.); subsequently, after any of the above combinations of treatment, the bananas are next stored in air (without any additional exogenous ethylene being introduced) at an air temperature of about 50° F. (10° C.) to about 60° F. (16° C.) (e.g., about 52, 54, 56, 58° F. or about 11, 12, 13, 14, 15° C.) for about 24 to about 72 hours, or about 32 to about 60 hours (e.g., about 34, 38, 42, 46, 48, 52, 56 hours) or, optionally by holding for an additional length of time (e.g., an additional 12, 24, 36, 48, 60 or 72 hours), until the bananas have reached a color stage of 3.0 to 3.5; during the storage the bananas are periodically ventilated to remove excess $CO_2$ and help maintain $O_2$ levels. In some embodiments, the internal temperature of the ripening bananas is maintained at about 50° F. (10° C.) to about 60° F. (16° C.) (e.g., about 52, 54, 56, 58° F. or about 11, 12, 13, 14, 15° C.) for about 24 to about 72 hours, or about 32 to about 60 hours (e.g., about 34, 38, 42, 46, 48, 52, 56 hours) or, optionally by holding for an additional length of time (e.g., an additional 12, 24, 36, 48, 60 or 72 hours), until the bananas have reached a color stage of 3.0 to 3.5. This ventilation can also remove any residual ethylene. The bananas may, for instance, be ventilated with ambient or outside air at equal or unequal intervals 1, 2, 3, or 4 times over this storage time. For example, for a 48 hour storage period the air may be ventilated once at 24 hours or twice at 16 hour intervals. Preferably, in any of the above, the ventilation air is adjusted to the storage air temperature, as described above, prior to contacting with the bananas and introduces 1 or, preferably, more (e.g., 2 to 10) volumes of the storage air volume. Accordingly, the ventilation air is adjusted to a temperature of about 50° F. (10° C.) to about 80° F. (27° C.) to help remove the exogenous ethylene (e.g., to reduce the concentration of exogenous, or optionally total, ethylene gas by at least 90, 91, 92, 93, 94, 95, 96, 97, 98, 99, 99.9, 99.99, 99.999%), or to a temperature of about 54° F. (12° C.) to about 70° F. (21° C.), or to a temperature of about 54° F. (12° C.) to about 60° F. (16° C.). In addition, the ventilating steps above can be independently performed from about 30 to about 90 minutes. In some embodiments, or in any of the embodiments set forth herein, the ventilating steps can be independently performed for about 45 to about 60 minutes. In other embodiments, the ventilating steps can independently be performed for about 10, 12, 15, 16, 18, 20, 22, 25, 27, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 78, 79, 80, 81, 82, 83, 84, 85, 86, 87, 88, 89, 90, 91, 92, 93, 94, 95, 96, 97, 98, or 99 minutes. Advantageously, the ripening method also surprisingly provides a means of obtaining bananas which are up to about 25% sweeter (e.g., at least about 10, 15, 20 or 25% sweeter (as measured by Brix), and/or up to about 25% firmer (e.g., at least about 5, 10, 15, or 20%) firmer (which can increase resistance to bruising), and/or have an improved texture, as compared to control bananas and/or in the absence of blemishing or signs of over ripeness.

In the any of the methods and systems set forth herein, the average relative humidity of the treatment and/or storage air to be contacted with the bananas can also be maintained between about 80% to about 99%. In some embodiments of these methods and systems, or in any of the embodiments set forth herein, the relative humidity is between about 82% to about 97%. In further embodiments set forth herein, the relative humidity is between about 84% to about 96%. In other embodiments of the above, the relative humidity is between about 85% to about 95%. In still further embodiments of the above, the relative humidity is between about 87% to about 95%. In still yet other embodiments of the above, the relative humidity is between about 90% to about 95%. In some embodiments of the methods and systems according to the invention, the relative humidity is between about 80% to about 85%. In other embodiments, or in any of the embodiments of the methods and systems set forth herein, the relative humidity is about 80, 81, 82, 83, 84, 85, 86, 87, 88, 89, 90, 91, 92, 93, 94, 95, 96, 97, 98, or 99% relative humidity. In some further embodiments, the ventilation air is also provided with these humidity levels.

In a particular embodiment of the methods according to the invention, the present invention provides a method for accelerating the ripening of bananas to color stage 3.0 to 3.5. The method includes the steps of 1) exposing hard green bananas for about 24 hours to exogenous ethylene gas by flowing air containing the exogenous ethylene gas over the surface of the bananas, wherein the averaged minimum ethylene concentration in the air of about 150 parts per million to an averaged maximum concentration of about 600 parts per million, and wherein the air is at a controlled air temperature of about 70° F. (21° C.) to about 80° F. (27° C.); 2) ending the exposing by ventilating the bananas with forced air at an air temperature of about 50° F. (10° C.) to about 80° F. (27° C.); 3) storing the bananas in air at an air temperature of about 50° F. (10° C.) to about 60° F. (16° C.) for about 24 hours or optionally holding the bananas for an additional period (e.g., from about 12 hours to about 72 hours), until the bananas have reached a color stage of 2.5 to 3.0; 4) ventilating the stored bananas with forced air at an air temperature of about 50° F. (10° C.) to about 80° F. (27° C.) to remove excess $CO_2$; and 5) storing the bananas in a controlled air temperature of about 50° F. (10° C.) to about 60° F. (16° C.) for about 24 hours, or optionally holding the bananas for an additional period (e.g., from about 12 hours to about 72 hours), until the bananas have reached a color stage of 3.0 to 3.5. In some embodiments, the storing step occurs at 14° C. In some embodiments, the exposing step occurs at 24° C. or 25° C.

In some embodiments of the methods according to the invention, provided is a method for accelerating the ripening of bananas to color stage 3.0 to 3.5. The method includes the steps of 1) exposing hard green bananas for about 24 hours to exogenous ethylene gas by flowing air containing the exogenous ethylene gas over the surface of the bananas, wherein the averaged minimum ethylene concentration in the air of about 200 parts per million to an averaged maximum concentration of about 400 parts per million, and wherein the air is at a controlled air temperature of about 72° F. (22° C.) to about 78° F. (26° C.); 2) ending the exposing by ventilating the bananas with forced air at an air temperature of about 50° F. (10° C.) to about 80° F. (27° C.); 3) storing the bananas in air at an air temperature of about 54° F. (12° C.) to about 60° F. (16° C.) for about 24 hours; or optionally holding the bananas for an additional period (e.g., from about 12 hours to about 72 hours) until the bananas have reached a color stage of 2.5 to 3.0; 4) ventilating the stored bananas with forced air at an air temperature of about 54° F. (12° C.) to about 60° F. (16° C.) to remove excess $CO_2$; and 5) storing the bananas in a controlled air temperature of about 50° F. (10° C.) to about 60° F. (16° C.) for about 24 hours; or optionally holding the bananas for an additional period (e.g., from about 12 hours to about 72 hours) until the bananas have reached a color stage of 3.0 to 3.5.

Optionally, any of the above the methods of the present invention can include the step of maintaining a static pressure of at least about 45 to about 55 Pa ($N/m^2$). For instance, the methods can include a static pressure, relative to the outside pressure, of at least about 45 to about 55 Pa ($N/m^2$). In some other embodiments, the method includes the step of maintaining a static pressure of at least about 0.18 to about 0.22 inches of water. In any of the methods or systems set forth herein, the methods can include that the concentration range in item (1), above, is an averaged minimum ethylene concentration in air of about 250 parts per million to an averaged maximum concentration of 500 parts per million. In some further embodiments, the methods include that the temperature in item (1), above, is about 75° F. (24° C.). In some embodiments, the methods include that the temperature in items (3), (4), and (5), above is about 57° F. (14° C.).

In certain embodiments, the present invention provides methods wherein the ventilating in either items (2) or (4), above, reduces the concentration of $CO_2$ in the air and also increases the concentration of $O_2$ in the air about the bananas. In certain embodiments ventilating in step 2) and/or step 4) reduces the $CO_2$ levels to no more than about 5% of $CO_2$ in the air about the bananas, (e.g., no more than about 4%, no more than about 3%, no more than about 2%, no more than about 1%, or no more than about 0.5% $CO_2$ in the air about the bananas).

In some embodiments, the present invention provides methods wherein the ventilating in either items (2) or (4), above, reduces the concentration of $CO_2$ in the air and also increases the concentration of $O_2$ in the air about the bananas. In certain embodiments ventilating in step 2) and/or step 4) reduces the $CO_2$ levels to less than about 5% of $CO_2$ in the air about the bananas, (e.g., less than about 4%, less than about 3%, less than about 2%, less than about 1%, or less than about 0.5% $CO_2$ in the air about the bananas).

In some other embodiments, the present invention provides ripening methods wherein the ventilating in either items (2) or (4), above is performed for about 30 to about 90 minutes. In some embodiments, or in any of the embodiments set forth herein, the ventilating in either items (2) or (4), above is performed for about 45 to about 60 minutes. In other embodiments, the ventilating is performed for about 10, 12, 15, 16, 18, 20, 22, 25, 27, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 78, 79, 80, 81, 82, 83, 84, 85, 86, 87, 88, 89, 90, 91, 92, 93, 94, 95, 96, 97, 98, or 99 minutes.

In one instance, ventilation using forced air in step 2) and/or step 4) is conducted by using forced air from an air conditioner.

In some embodiments, storing in step 3) and/or step 5) is carried out for about 24 hours, and is optionally followed by an additional holding time until the desired degree of ripeness is reached. The additional holding time may be from about 6-72 hours. Additional cycles of ventilation may be performed during the optional holding period to control the level of $CO_2$ in the air.

For any of the embodiments described above, in one aspect, the ripening method provides bananas which are up to about 25% sweeter (e.g., at least about 5, 10, 15, 20 or 25% sweeter (as measured by Brix), and/or up to about 25% firmer (e.g., at least about 5, 10, 15, or 20%) firmer (which can increase resistance to bruising), and/or have an improved texture, as compared to control bananas. In some embodiments, the ripening methods described herein provides bananas lacking blemishing or signs of over ripeness as compared to control bananas. In some embodiments, the ripening methods and procedures described herein provide bananas which are at least about 25% sweeter as compared to control bananas as measured by Brix. In some embodiments, the ripening methods and procedures described herein provide bananas which are at least about 20% sweeter as compared to control bananas as measured by Brix. In some embodiments, the ripening methods and procedures described herein provide bananas which are at least about 15% sweeter as compared to control bananas as measured by Brix. In some embodiments, the ripening methods and procedures described herein provide bananas which are at least about 10% sweeter as compared to control bananas as measured by Brix. In some embodiments, the ripening methods and procedures described herein provide bananas which are at least about 5% sweeter as compared to control bananas as measured by Brix. In such cases, the sweeter bananas provide improved taste and appearance.

In some embodiments, the ripening methods and procedures described herein provide bananas which are at least about 25% firmer as compared to control bananas. In some embodiments, the ripening methods and procedures described herein provide bananas which are at least about 20% firmer as compared to control bananas. In some embodiments, the ripening methods and procedures described herein provide bananas which are at least about 15% firmer as compared to control bananas. In some embodiments, the ripening methods and procedures described herein provide bananas which are at least about 10% firmer as compared to control bananas. In some embodiments, the ripening methods and procedures described herein provide bananas which are at least about 5% firmer as compared to control bananas. In such cases, firmer bananas are less prone to bruising, thereby allowing for improved texture and appearance.

In any of the embodiments set forth herein, the methods and systems according to the invention may include bananas that are in banana boxes. In some further such embodiments, the banana boxes are on pallets. In yet further other embodiments, the pallets are arranged to promote air to flow through the banana boxes and across the bananas. In other embodiments, the type of banana is selected from the group consisting of baby, manzano, burro, plantain, red, apple banana, Cavendish, lady finger, pisang, williams, and cooking. In some embodiments, the type of banana is baby. In some other embodiments, the type of banana is manzano. In some embodiments, the type of banana is burro. In some embodiments, the type of banana is plantain. In some other embodiments, the type of banana is red. In some embodiments, the type of banana is apple banana. In some embodiments, the type of banana is Cavendish. In some other embodiments, the type of banana is lady finger. In some embodiments, the type of banana is pisang. In some other embodiments, the type of banana is williams. In some embodiments, the type of banana is cooking.

Figure 4:
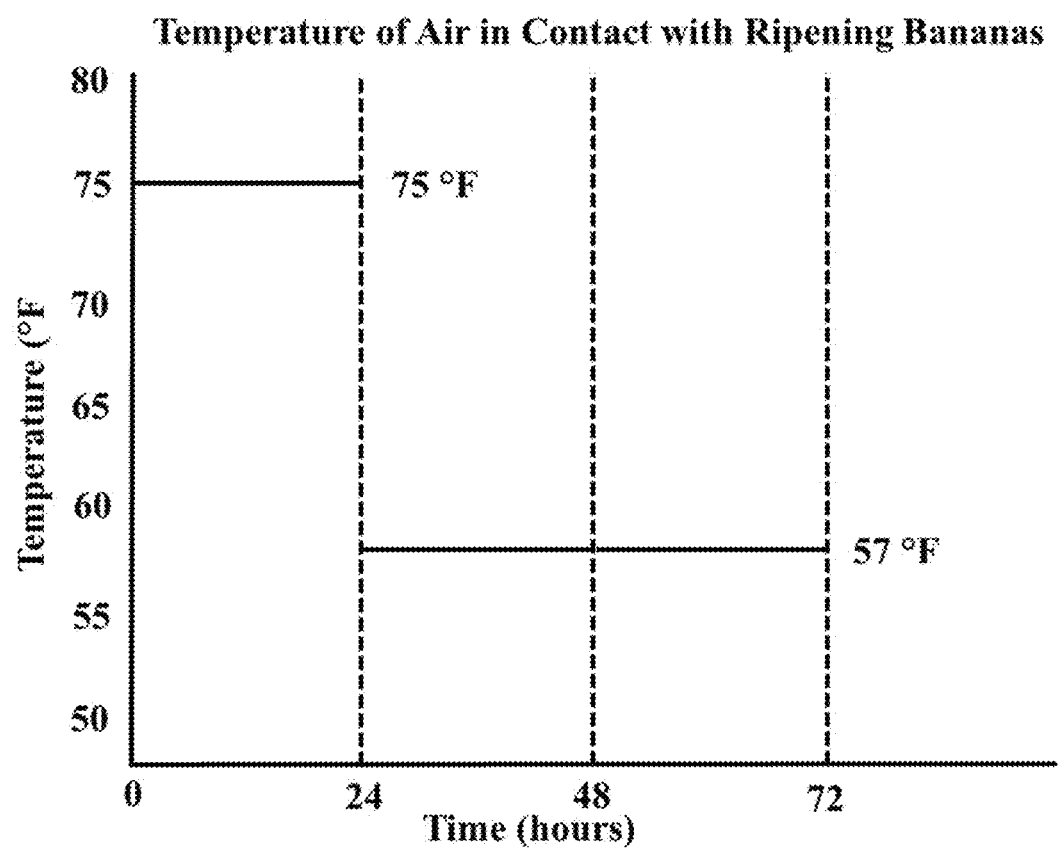
FIG. 4 shows a plot of the temperature of the air in contact with the ripening bananas as a function of time for a method of ripening bananas set forth herein.
Figure 5:
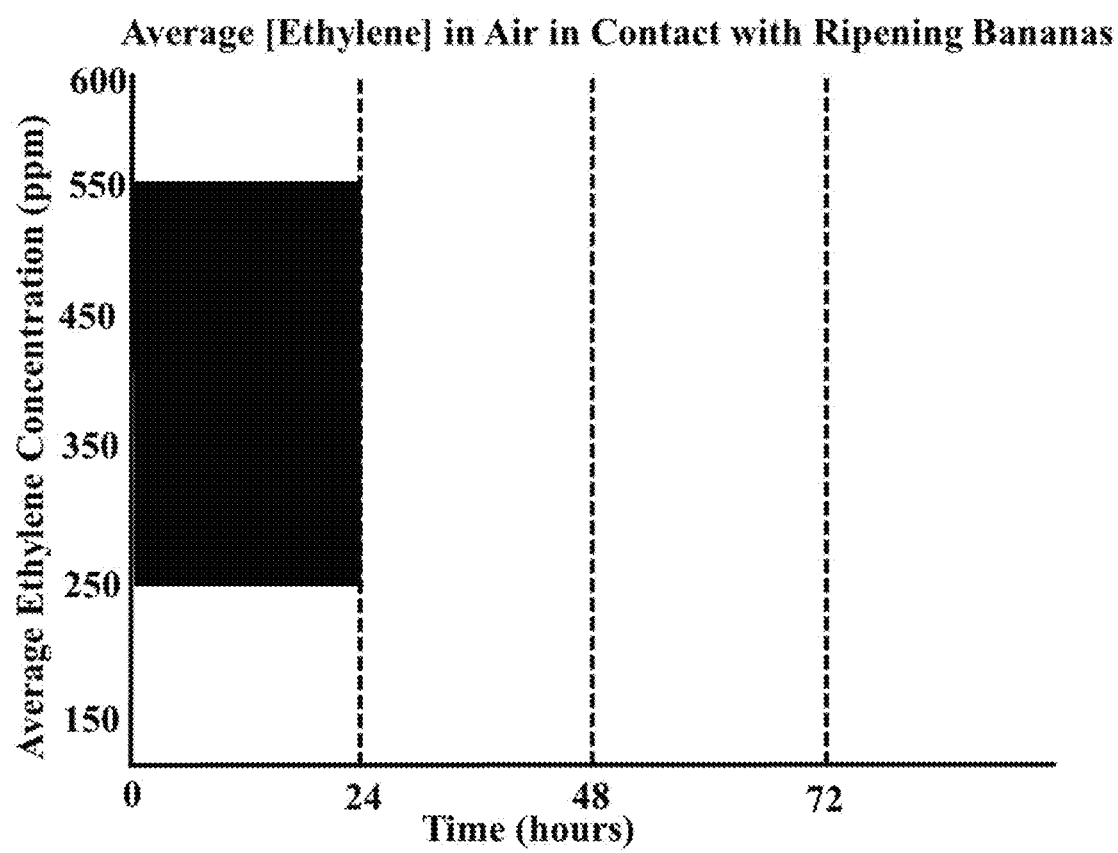
FIG. 5 shows a plot of the average ethylene concentration in the air in contact with the ripening bananas as a function of time for a method of ripening bananas set forth herein.
Figure 7:
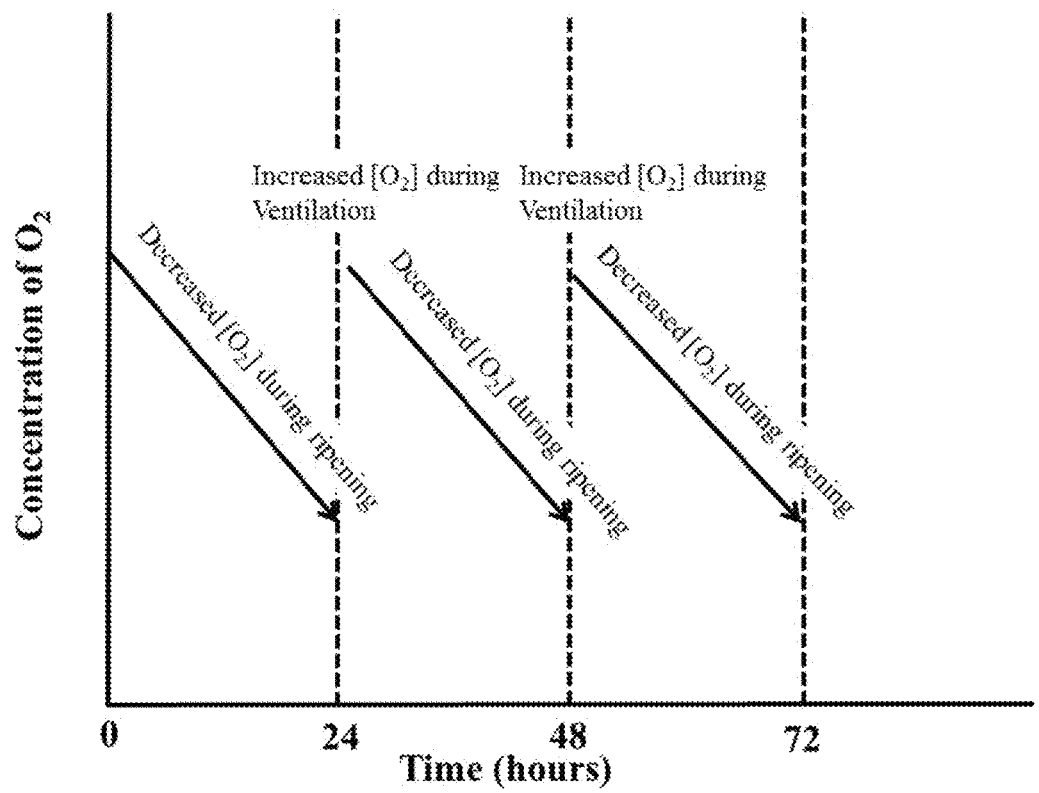
FIG. 7 shows a plot of $O_2$ concentration as a function of time for a method of ripening bananas set forth herein.

FIG. 4 illustrates how temperature can be controlled during one of the methods set forth herein. In this illustration, the temperature is held about 75° F. (24° C.) for the initial twenty four hour period. Subsequent to this, the temperature is held at 57° F. for two additional twenty four hour periods. FIG. 5 illustrates how an exogenous supply of ethylene can be controllably provided at a concentration of 250-550 ppm for the initial twenty four hour period in a method of the present invention. Subsequent to this, ethylene may be present as a result of being released from the ripening bananas. However, in the method of FIG. 5, exogenous sources of ethylene are only used during the initial twenty four hour period. FIG. 5 illustrates how $CO_2$ increases while the fruit is ripening and the ripening room is not venting. Also, $CO_2$ decreases when the ripening room is vented. FIG. 7 illustrates how $O_2$ decreases while the fruit is ripening and the ripening room is not venting. Also, $O_2$ increases when the ripening room is vented.

In several embodiments, the inventive methods set forth herein for ripening bananas is also suitable for ripening other fruit such as, but not limited to, plantains, hybrid bananas, and any of the banana types set forth herein, e.g., Cavendish. Cavendish bananas include Cavendish cultivars such as, but not limited to, "Dwarf Cavendish," "Grande Naine," "Lacatan," "Poyo," "Valery," and "Williams," "Double", "Dwarf Cavendish", "Extra Dwarf Cavendish", "Pisang Masak Hij au", and "Giant Cavendish."

In some embodiments, the methods set forth herein are useful for ripening bananas to have a set of properties a color stage of about 3 to about 4, a brix % of about 17 to 19%, and a firmness of about 225 to 235 g. In other embodiments, the bananas have a color stage of about 3, a brix % of about 18%, and a firmness of about 230 g. In some other embodiments, the bananas have a color stage of about 3 and a brix % of about 18. In some other embodiments, the bananas have a color stage of about 3 and a firmness of about 230 g.

In some embodiments, the methods set forth herein are useful for ripening bananas to have a set of properties a color stage of about 4 to about 5, a brix % of about 20 to 24%, and a firmness of about 180 to 210 g. In other embodiments, the bananas have a color stage of about 5, a brix % of about 23%, and a firmness of about 180, 190, or 200 g. In some other embodiments, the bananas have a color stage of about 5 and a brix % of about 22. In some other embodiments, the bananas have a color stage of about 5 and a firmness of about 200 g.

In some embodiments, the methods set forth herein are useful for ripening bananas to have a set of properties a color stage of about 6 to about 7, a brix % of about 21 to 25%, and a firmness of about 160 to 180 g. In other embodiments, the bananas have a color stage of about 7, a brix % of about 23%, and a firmness of about 180 or 190 g. In some embodiments, the brix % is about 21, 22, 23, 24, or 24. In some other embodiments, the bananas have a color stage of about 7 and a brix % of about 23. In some other embodiments, the bananas have a color stage of about 7 and a firmness of about 180 g.

In some embodiments, the ripened bananas have a color stage of about 3 to about 4, a brix % of about 17 to about 20, and a firmness of about 225 to about 270 g. In some embodiments, the ripened bananas have a color stage of about 4 to about 5, a brix % of about 17 to about 22%, and a firmness of about 205 to about 275 g. In some embodiments, the brix % is about 17, 18, 19, 20, 21, or 22.

In some embodiments, the ripened bananas have a color stage of about 5 to about 6, a brix % of about 20 to about 24, and a firmness of about 220 to about 270 g. In some embodiments, the firmness is about 230, 235, 240, 245, 250, 255, 260, 265, or 270 g. In some embodiments, the firmness is about 230, 240, 250, 260, or 270 g. In some embodiments, the brix % is about 21, 22, 23, or 24.

In some embodiments, the ripened bananas have a color stage of about 6 to about 7, a brix % of about 21 to 24% and a firmness of about 205 to 235 g. In some embodiments, the color stage is 6.5. In some embodiments, the firmness is about 205, 210, 215, 220, 225, 230, or 235.

Ripening Room Loading Procedures

In some embodiments, the present methods and systems of the invention further provide for arranging pallets in a ripening room to provide for the proper flow of air through the ripening room and in the vicinity of the ripening bananas. In some of these embodiments, the pallets are placed firmly against the plenum or baffle side of the room to create a tight seal. In certain embodiments, each pallet is positioned to eliminate air gaps there between pallets and/or the plenum or baffle side of the room. In some other embodiments, any leaning pallets are positioned against the plenum or baffle portion of the ripening room. In some embodiments, any empty or uneven cells, wherein a pallet could be placed, are sealed with either a pallet seal plate or a dummy pallet. The methods of the present invention set forth, in some embodiments, that the pallets are positioned tightly against each other to provide for the proper sealing and air flow through the banana boxes. In those embodiments wherein dummy pallets are used, the dummy pallets should be constructed with the same height as a full pallet of bananas. The methods of the present invention provide that any empty pallets which are used as dummy pallets are shrink wrapped together to prevent the formation of air gap openings there between.

Typically, a ripening room with a full load comprises 40 pallets, with 48 boxes per pallet, at about 40 pounds per box, and about 13 banana clusters per 40 pound box, and about 7 bananas per cluster. Other ripening room loads are also contemplated within the scope of embodiments presented herein.

In some embodiments, temperature sensors or monitors are positioned to measure the temperature of the air in contact with the ripening bananas. In certain embodiments, the temperature sensors or monitors measure the temperature on the surface of a ripening banana. In some of the embodiments set forth above, the temperature sensors or monitors measure the internal temperature of a ripening banana.

Ripening Cycle

The present invention provides methods of ripening fruits, such as, but not limited to, bananas. In some embodiments the bananas are received hard green and stored at a temperature of about 57 to 59° F. (14-15° C.) prior to the being ripened according to the methods and systems set forth herein. In some further embodiments of such, the fruits are not warmed before being contacted with ethylene.

In some embodiments, the methods of ripening bananas include controlling the air temperature in contact with the bananas at about 75° F. (or about 24° C.). In some embodiments, the methods of ripening include introducing hard green bananas into a controlled air temperature of about 75° F. (about 24° C.). Next, in some embodiments, ethylene gas is exposed to the hard green bananas, optionally with forced air, for about twenty four hours. In some of these embodiments, the ethylene has an averaged concentration when exposed to the bananas of about 250 to 500 parts per million (ppm), or from about 200 to 400 ppm. Next, in some embodiments, the methods of the present invention provide for venting the air around the bananas for approximately 45 to 60 minutes. In some of these embodiments, the methods provide for ventilating so as to reduce $CO_2$ concentrations and to increase $O_2$ concentrations in the air in immediate contact with the ripening bananas such that the $CO_2$ levels are no more than about 5% in the air about the bananas. In some embodiments, the methods further provide for reducing the temperature from about 75° F. to about 57° F. (from about 24° C. to about 14° C.). In some embodiments, the temperature is reduced with forced-air (e.g., from an air conditioner) and for about twenty four hours. In some embodiments, the bananas are stored at a temperature of about 57° F. (14° C.) for about 24 hours. In some embodiments, the bananas are held at a temperature of about 57° F. (14° C.) for an additional period of time. In some embodiments, the bananas are stored until the bananas reach a color stage of 2.5 to 3.0. In some embodiments, the methods of the present invention set forth that the bananas are thereafter ventilated and stored for another twenty four hours at about 57° F. (14° C.). In some other embodiments, the methods of the present invention set forth that the bananas are thereafter ventilated and stored for yet another twenty four hours at about 57° F. (14° C.). In some embodiments, additional cycles of ventilation, storage and holding, as described above, are employed. In certain embodiments, the bananas are stored at 57° F. (14° C.) until the bananas reach a color stage of 3.0 to 3.5.

Figure 3:
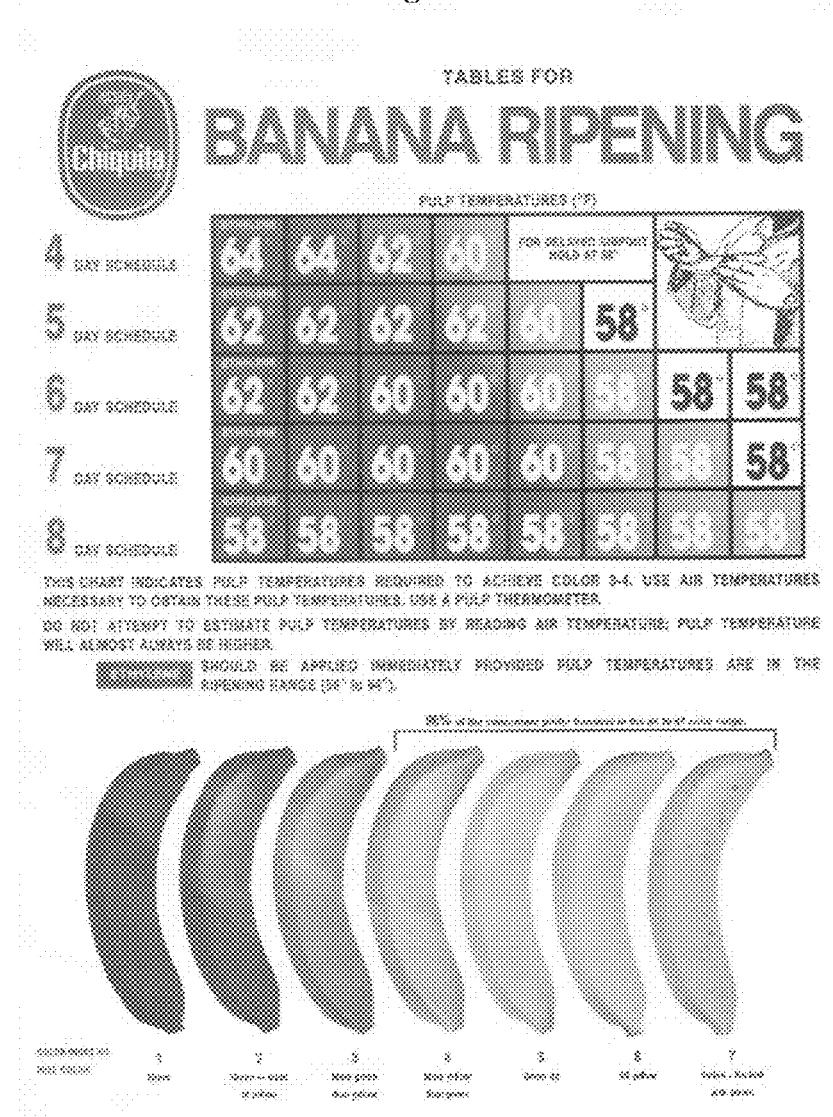
FIG. 3 shows a ripening schedule and color chart used in an Example.

FIG. 3 shows a color chart for determining the color stage of bananas. FIG. 3 also shows a ripening schedule that may be used with a method set forth herein.

The present invention also provides methods which include combination of the aforementioned steps.

IV. Systems

In some embodiments, the present invention provides systems which are useful for ripening bananas.

In one aspect, the present invention provides a system for accelerating the ripening of bananas to color stage 3.0 to 3.5. The system includes 1) a source of ethylene and an ethylene generator for exposing bananas to exogenous ethylene, and a controller for releasing the desired quantity of exogenous ethylene into the air, and optionally a detector for monitoring ethylene levels with a feedback loop to the controller which adjusts the rate of addition of the exogenous ethylene to achieve the desired ethylene air gas concentration in contact with the bananas; 2) an air flow controller unit; 3) a thermostated heating or cooling device for maintaining a controlled air temperature about the bananas of about 50° F. (10° C.) to about 80° F. (27° C.) in the ripening room/chamber; 4) a humidifier for maintaining a controlled relative humidity in the ripening room/chamber atmosphere about the bananas of about 80% to about 100%; and 5) at least one vent.

In another aspect, the present invention provides a system for accelerating the ripening of bananas to color stage 3.0 to 3.5. The system includes 1) a source of ethylene and an ethylene generator for exposing bananas to exogenous ethylene; 2) a fan unit and a vent which operate to maintain a static air pressure about the bananas in the ripening room/chamber of at least about 45 to about 55 Pa ($N/m^2$); 3) an air flow controller unit; 4) a thermostated heating or cooling device for maintaining a controlled air temperature about the bananas of about 50° F. (10° C.) to about 80° F. (27° C.) in the ripening room/chamber; 5) a humidifier for maintaining a controlled relative humidity in the ripening room/chamber atmosphere about the bananas of about 80% to about 100%; and 6) at least one vent.

In any of the systems set forth herein, means for measuring the surface temperature of a ripening banana may be included. Also, in any of the systems set forth herein, means for measuring the internal temperature of a ripening banana may be included. Means for measuring temperature may include, but is not limited to, a thermometer, a thermostat, a digital thermometer, or a temperature sensing thermocouple.

Figure 2:
FIG. 2 shows a typical ripening room.

FIG. 2 shows a representative ripening room. Included in FIG. 2 are pallets of bananas wherein the bananas are in banana boxes. Further, the pallets are arranged in a particular way to use with a method set forth herein.

In some systems set forth herein, the present invention provides an ethylene sensors that is useful for monitoring and controlling the concentration of ethylene in contact with the ripening bananas. In some embodiments, the ethylene sensor is included in a feedback mechanism for controlling the ethylene concentration. In other embodiments, the ethylene concentration is controlled by maintaining a certain ethylene concentration in the air which is forcibly introduced into the ripening room and is in contact with the ripening bananas.

In some embodiments, the present invention provides a system for accelerating the ripening of bananas to color stage 3.0 to 3.5. In some embodiments, the system includes a source of ethylene and an ethylene generator for exposing bananas to exogenous ethylene; a fan unit and a vent which operate to maintain a static air pressure about the bananas of at least about 44.8 to about 54.7 Pa ($N/m^2$); an air flow controller unit; a thermostat for maintaining a controlled air temperature about the bananas of about 50° F. (10° C.) to about 80° F. (27° C.); a humidifier for maintaining a controlled relative humidity in the air about the bananas of about 80% to about 100%; and at least one vent.

In some embodiments, the present invention provides a system for accelerating the ripening of bananas to color stage 3.0 to 3.5. The system includes a source of ethylene; a means for exposing the bananas to ethylene in a ripening room; a means for maintaining a static air pressure about the bananas of at least about 0.18 to about 0.22 inches of water; a means for controlling the flow of air about the bananas; a means for maintaining a controlled air temperature about the bananas of about 50° F. (10° C.) to about 80° F. (27° C.); a means for maintaining a controlled relative humidity in the air about the bananas of about 80% to about 100%; and a means for ventilating the ripening room.

In some other embodiments, the present invention provides that the means for exposing the bananas comprises a means for maintaining an averaged minimum ethylene concentration of about 250 parts per million in the air about the bananas. In other embodiments, the present invention provides that the means for maintaining an averaged minimum ethylene concentration of about 250 parts per million are also able to maintain an averaged maximum ethylene concentration of about 500 parts per million. In yet other embodiments, the present invention provides that the means for maintaining an averaged minimum ethylene concentration of about 250 parts per million comprises an ethylene generator, a fan unit, and a vent. In further embodiments, the present invention provides that the means for maintaining an averaged minimum ethylene concentration of about 200-400 parts per million and comprises an ethylene generator, a fan unit, and a vent.

In some embodiments, the source of ethylene is liquid ethylene. In other embodiments, the source of ethylene is gaseous ethylene. In certain embodiments, the gaseous ethylene is compressed gaseous ethylene. The present invention also provides a system having means for exposing the bananas to ethylene in a ripening room, and wherein those means include, either individually or in any combination thereof, a source of ethylene, compressed gas, blower fans, fan units, vacuum systems, vents and an ethylene generator. In other embodiments, the means for exposing the bananas to ethylene include a source of ethylene and an ethylene generator which controllably releases ethylene into the atmosphere of the ripening room. The systems of the present invention optionally include an ethylene sensor as part of an automatic ethylene concentration control loop. In some embodiments of the present invention, the means for maintaining a static air pressure about the bananas of at least about 0.18 to about 0.22 inches of water include, either individually or in any combination thereof, fan units, vacuum units, blower systems, pressure gauges, units for controlling the flow of air in atmosphere of the ripening room, and vents. In yet other embodiments, the present invention sets forth methods and systems where the means for controlling the flow of air about the bananas include, either individually or in any combination thereof, an enclosable room, a ventable room, vents, valves, and pressure gauges. In other embodiments, the means for maintaining a controlled air temperature about the bananas of about 50° F. (10° C.) to about 80° F. (27° C.) include, either individually or in any combination thereof, a thermostated heating or cooling device (e.g., an air conditioner), valves, vents and sources of gases such as, but not limited to, cooled air or heated air. In still other embodiments, the present invention provides that the means for maintaining a controlled relative humidity in the air about the bananas of about 80% to about 100% include, either individually or in any combination thereof, a humidifier, valve, vents, sources of humid air, and fan units. In certain embodiments, the present invention provides means for ventilating the ripening room which include, but which are not limited to and which are either individually or in any combination thereof, vents, values, fan units, exhaust units, windows, and doors.

In some embodiments, the present invention provides a system having a source of ethylene is liquid ethylene. In other embodiments, the system is such that the temperature is about 57° F. (14° C.) to about 75° F. (24° C.). In other embodiments, the relative humidity of the system is about 85% to about 95%. In yet other embodiments, the means for maintaining a static pressure is a ventable room having a fan unit and a vent which opens or closes at set pressure values. In certain embodiments, the means for controlling the flow of gas include at least one fan unit. In some embodiments, the system set forth herein has two fan units wherein one is an inlet fan unit and the other is an exhaust fan unit. In other embodiments, the means for controlling the flow of gas comprises an air compressor and a vent. In some embodiments, the means for introducing forced air is an air compressor or a fan.

In certain embodiments, the present invention provides a system having a pressure gauge to measure the static pressure. In other embodiments, the present invention provides a system having a static pressure of 49.8 Pa. In some embodiments, the static pressure is 0.20 inches of water.

In some embodiments, the system set forth herein includes at least one pallet. In some other embodiments, the system set forth herein includes at least one pallet that does not have banana boxes in addition to at least one pallet that does have a banana box.

Figure 9:
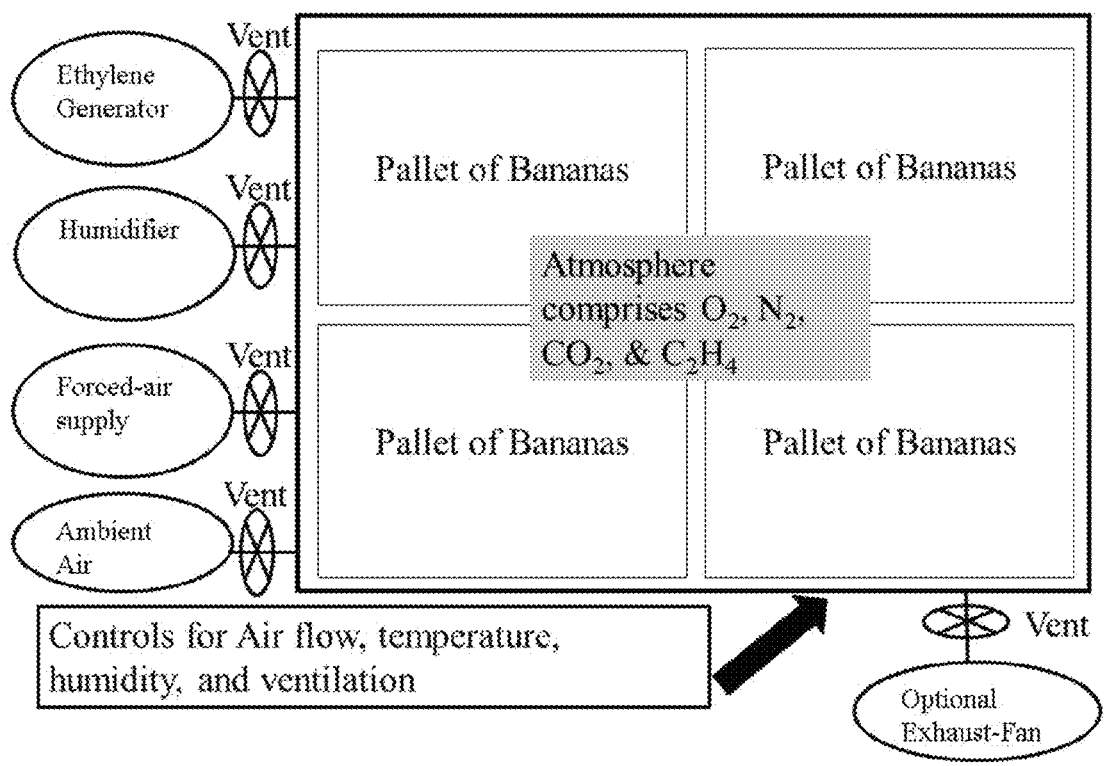
FIG. 9 shows a representative ripening system for use with the present invention.

FIG. 9 shows a representative ripening system for use with the present invention, which includes following: 1) an ethylene generator in mechanical communication via a vent to a ripening room; 2) a humidifier in mechanical communication via a vent to a ripening room; 3) a forced-air supply in mechanical communication via a vent to a ripening room; 4) ambient air in mechanical communication via a vent to a ripening room; 5) a ripening room with a pallets having bananas and arranged so as to provide for the proper flow of air through the system; 6) electronic or mechanical controls for air flow, ethylene, temperature, humidity, and/or ventilation; and optionally 7) an exhaust fan. Inside the ripening room, there is an atmosphere that includes some $O_2$, $N_2$, $CO_2$, and $C_2H_4$, all of which are at least present in the gas phase.

Ripening Room Conditions

In some embodiments, the ripening room conditions are controllably modulated in order to ripen bananas.

In some embodiments, the present invention provides methods for controlling the static pressure in a banana ripening room. In certain embodiments, the plenum or baffle pressures should be at least 0.20 inches of water when measured with a pressure gauge. If a low pressure is observed, it may be a result of a pallet being improperly placed against the plenum or baffle seals and curtains. Low pressure can also be attributed to a dirty, blocked or inoperable cooling fan.

In certain embodiments, the systems of the present invention include set points and/or fan units. In some embodiments, the banana ripening rooms have temperatures from about 57 to 75 degrees Fahrenheit (which is equivalent to 14 to 24 degree Celsius). In certain embodiments, the rooms have two sets of fan units. In some embodiments, the fan unites are on the left and right side. In other embodiments, the fan units are in front and rear locations. It is best to avoid different temperature settings as this may cause some pallets of fruit to ripen differently than others depending on their positioning in a room.

In some embodiments, the presence invention includes a forced-air system. In other embodiments, the ripening rooms are gassed and cooled down with forced-air. In some embodiments, the ripening rooms are gassed with forced-air.

In certain embodiments, the present invention includes humidifiers for controlling the relative humidity in the immediate vicinity of ripening bananas. In some embodiments, the relative humidity is between about 80% to about 99%. In some other embodiments, the relative humidity is between about 82% to about 97%. In certain embodiments, the relative humidity is between about 84% to about 96%. In some embodiments, the relative humidity is between about 85% to about 95%. In some embodiments, the relative humidity is between about 87% to about 95%. In some embodiments, the relative humidity is between about 90% to about 95%. In some embodiments, the relative humidity is between about 80% to about 85%. In other embodiments, the relative humidity is about 80, 81, 82, 83, 84, 85, 86, 87, 88, 89, 90, 91, 92, 93, 94, 95, 96, 97, 98, or 99% relative humidity.

In certain embodiments, the relative humidity for the claimed invention must not exceed 95%. In other embodiments, the relative humidity for the claimed invention must not be less than 85%.

In some other embodiments, the present invention sets forth gassing equipment for gassing ethylene. This equipment is useful for maintaining a controlled average minimum ethylene concentration in the air directly in contract with ripening bananas.

In some embodiments, the present invention includes vents as means for venting ripening room. For example, after a ripening room has been gassed for twenty four hours with ethylene, the rooms is vented to reduce $CO_2$ concentrations which otherwise increase during the ripening process. In some embodiments, the vents are automatic vents. In others, the vents are passive vents. In yet other embodiments, the vents are manually operated. In certain embodiments, the present invention includes steps for venting a room daily to provide an exchange of oxygen with the air in contact with the fruit and also to reduce $CO_2$ concentrations.

Figure 6:
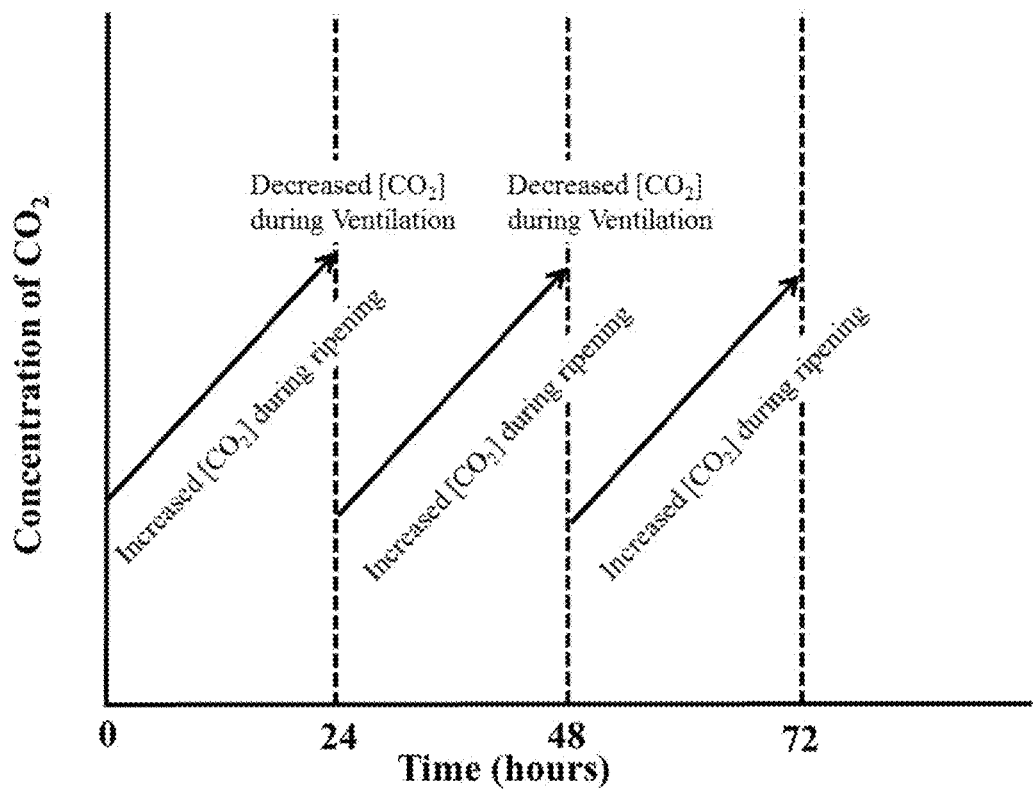
FIG. 6 shows a plot of $CO_2$ concentration as a function of time for a method of ripening bananas set forth herein.

The venting steps set forth herein are useful for decreasing the concentration of $CO_2$ which is built up in the ripening room during the ripening of the bananas. FIGS. 6-7 show the respective increase and decreases in the concentration of $CO_2$ and $O_2$ when the ripening room is not vented and also when the ripening room is vented.

V. Compositions of Matter

In some embodiments, the present invention provides bananas which are ripened according to a method set forth herein.

FIG. 1 shows a color chart that a skilled person can use to determine the color stage of bananas. The determination includes comparing the outside color and patterning of the bananas in question with the pictures of bananas in FIG. 1. The determination further includes associating the most similar color stage, as set forth in FIG. 1, with the actual outside color and patterning of the banana in question.

In some embodiments, the present invention provides a banana ripened to color stage 3 to 3.5 according to a method set forth herein. In some other embodiments, or in any of the embodiments set forth herein, the present invention provides banana ripened to color stage 3.0 to 6.0, having a higher soluble solids content (Brix) as indicated by sugar content and as compared to a naturally ripened banana. In yet other embodiments, as well as in any embodiment set forth herein, the present invention provides that the type of banana is selected from the group consisting of baby, manzano, burro, plantain, red, apple banana, Cavendish, lady finger, pisang, williams, and cooking.

Prior to using a method of ripening bananas, as set forth herein, the bananas are hard green and have a color stage between 0 and 1. After a twenty four hour period of ethylene exposure at 75° F., and a twenty four hour period of storage at 57° F., the bananas have a color stage between 2.5 and 3. After an additional twenty four hour period of storage at 57° F., the bananas have a color stage between 3 and 3.5.

Figure 8:
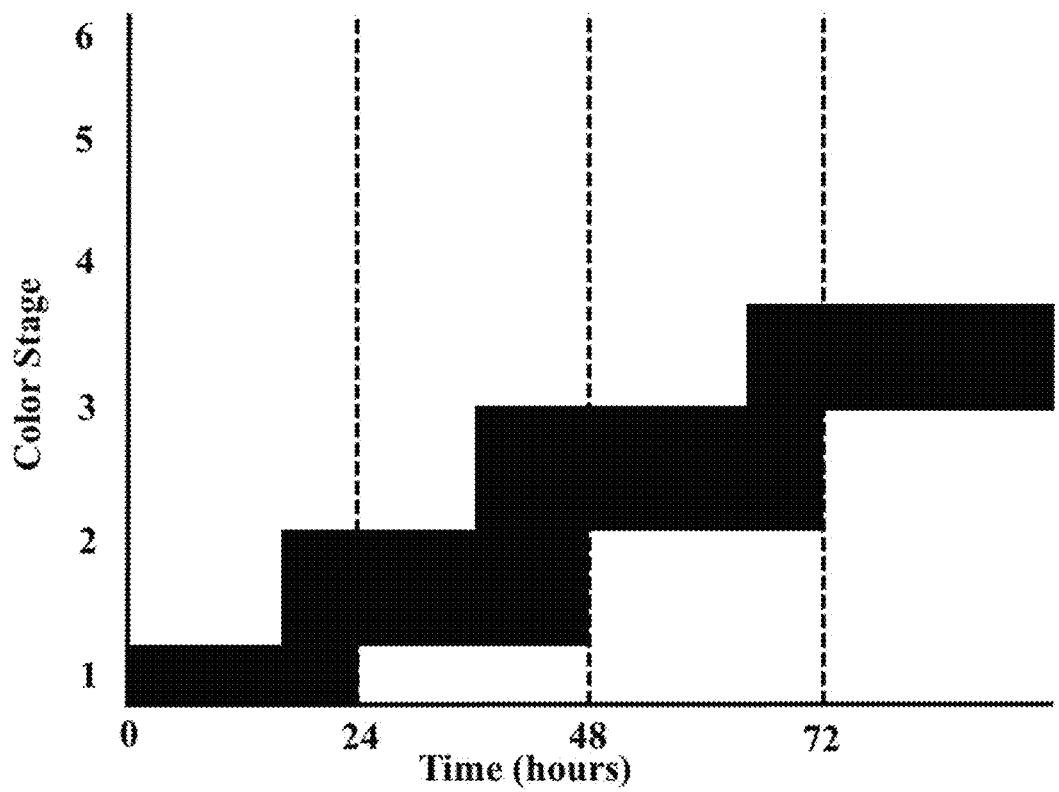
FIG. 8 shows a plot of the ripening bananas' color stage as a function of time for a method of ripening bananas set forth herein.

FIG. 8 shows a representative progression of color stages for bananas ripened according to a method set forth herein. In such a method, bananas start with a color stage of 1 or less than 1. After a 24 hour period of exogenous ethylene exposure at 75° F., and two 24 hour periods of storing at 57° F., bananas ripened according to the present invention may have a color stage of 3 to 3.5.

Food Products

The fruits and bananas that are ripened according to the methods set forth herein may be further processed in order to prepare food products. Bananas, as well as other fruits, which are ripened according to the methods set forth herein may be processed by taking an unpeeled banana, a peeled banana, or the pulp of a peeled or of an unpeeled banana, and heat treating the banana or pulp in order to produce a food product.

Also contemplated within the present invention are methods which use a banana ripened to a particular color stage according to a method set forth herein in order to make a secondary product, e.g. a food product. In some of these embodiments, the color stage is 1, 1.5, 2, 2.5, 3, 3.5, 4, 4.5, 5, 5.5, or 6. In some of these bananas, the banana is optionally peeled and optionally made into a puree. In some embodiments, the puree of either a peeled or unpeeled banana, ripened according a method set forth herein, are heat treated to gelatinize the starch present in the banana. In some embodiments, the gelatinizing occurs at about 60, 61, 62, 63, 64, 65, 66, 67, 68, 69, 70, 71, 72, 73, 74, 75, 76, 77, 78, 79 or 80° C. for at least 1 minute, at least five minutes, at least ten minutes, at least 15 minutes, or at least 20 minutes, or at least 60 minutes. In some embodiments, the heat treatment is not for more than 2 days, or not for more than 1 day, or not for more than half a day, or not for more than 6 hours, or not for more than 3 hours, or not for more than 2 hours, or not for more than 1 hour. In some other embodiments, the heat treatment is at 50, 55, 60, or 65° C.

In some embodiments, the puree described herein involves comminuting or pulverizing an unpeeled or a peeled banana that is ripened according to a method set forth herein.

Some of the methods set forth herein include drying the puree described herein using air, dry air, heat, dehydration techniques, and vacuum techniques. Once dried, the purees contemplated herein may be used as substitutes for gluten, or sugar, or a gelling agent, or a source of fiber, e.g. a fiber fortifying ingredient, or a texture modifier, or an emulsifying agent, or a sugar substitute. The purees which are used as substitutes, for example as sugar substitutes, may be used for making cookies, snack bars, granola bars, or cakes. In such embodiments, the sugar substitute is used in place of sugar in a method for making cookies, snack bars, granola bars, or cakes.

The bananas, purees, and combinations of materials set forth herein may be further processed to form a cereal, a drinkable substance, e.g., a banana smoothie, a granola bar, a fruit juice drink, or a dessert that includes bananas.

The bananas and fruits which are ripened according to the inventive methods set forth herein may be distinguished from other bananas and fruits that are naturally ripened with respect to the sugar content, the starch content, the protein content, the fat content, the fiber content, the cellulose content, the pectin content, or the α-glucan content difference between the bananas.

In some embodiments, the color charts which are useful for describing the color stage of a banana are also applicable to describing the color stage of a plantain.

The present invention also contemplates freeze-drying a banana or plantain that are ripened according a method set forth herein.

Banana, plantains, and other fruits which are ripened according to the methods set forth herein may be freeze-dried in order to produce food products having a water content of a from about 0.1% to about 10%, or from about 1% to about 10%, or from about 2% to about 9%, or from about 2% to about 7% w/w. The freeze-dried methods set forth herein may result in a dried banana or dried plantain that has a water content that is not more than 10%. The freeze-dried methods set forth herein may result in a dried banana or dried plantain that has a water content that is not more than 9%. The freeze-dried methods set forth herein may result in a dried banana or dried plantain that has a water content that is not more than 8%. The freeze-dried methods set forth herein may result in a dried banana or dried plantain that has a water content that is not more than 7%. The freeze-dried methods set forth herein may result in a dried banana or dried plantain that has a water content that is not more than 6%. The freeze-dried methods set forth herein may result in a dried banana or dried plantain that has a water content that is not more than 5%. The freeze-dried methods set forth herein may result in a dried banana or dried plantain that has a water content that is not more than 4%. The freeze-dried methods set forth herein may result in a dried banana or dried plantain that has a water content that is not more than 3%. The freeze-dried methods set forth herein may result in a dried banana or dried plantain that has a water content that is not more than 2%. The freeze-dried methods set forth herein may result in a dried banana or dried plantain that has a water content that is not more than 1%. The freeze-dried methods set forth herein may result in a dried banana or dried plantain that has a water content that is not more than 0.5%.

Freeze-drying, as set forth herein, may include the following steps: 1) slicing the fruit, e.g. banana or plantain, to a width of approximately 1, 2, 3, 4, 5, 6, 7, 8, 9, 10, 12, 13, 14, or 15 mm or to a width of 1, 2, 3, 4, 5, 6, 7, 8, 9, 10, 12, 13, 14, or 15 cm; 2) placing the sliced fruit in an autoclave or dehydrator; 3) dehydrating or freeze-drying the sliced fruit.

Freeze-drying, as set forth herein, may include the following steps: 1) pulverizing the fruit, e.g. banana or plantain, to a width of approximately 1, 2, 3, 4, 5, 6, 7, 8, 9, 10, 12, 13, 14, or 15 mm or to a width of 1, 2, 3, 4, 5, 6, 7, 8, 9, 10, 12, 13, 14, or 15 cm; 2) placing the pulverized fruit in an autoclave or dehydrator; 3) dehydrating or freeze-drying the pulverized fruit.

Some of the food products set forth herein include, but are not limited to at least one whole grain flour, starch, baking powder, and at least one of green banana powder, green banana puree, green plantain powder, green plantain puree, yellow plantain powder, and yellow plantain puree. In some embodiments, the product include a flour, powder, or puree of a banana or plantain that is ripened according a method set forth herein. Some of the food products set forth herein include, but are not limited to, a flour derived from a banana or plantain that has a color stage of 1, 1.5, 2, 2.5, 3, 3.5, 4, 4.5, 5, 5.5, 6, or 7.

In some embodiments, the present invention provides a mixture or a combination of flour and optionally a puree set forth herein. Flour, as used herein, may include, but is not limited to, oat flour, wheat flour, corn flour and mixtures thereof, as well as other flours, grains and mixtures thereof. The flour mixtures and combinations described herein may also include sugar in any suitable form such as molasses, unsulphured molasses, honey, sucrose, or other suitable sugars and mixtures thereof. The banana purees, and or the plantain purees, may act as bulking agents to reduce the amount of sugar used in another food product, e.g., a cookie or a granola bar. The flour mixture may also include other natural and/or artificial materials, including salt, additional flavors, vitamins and, or, minerals as desired. Banana puree and, or, plantain puree can act, in some instances, as a sugar substitute.

In some embodiments, the food products described herein may be combined with other components such as, but not limited to or necessarily comprehensive of, a texture modifier, a natural binder, a fiber fortifying agent, a bulking agent, a sugar substitute, a flour selected from cake flour, wheat flour, corn flour, or oat flour, a sugar selected from white sugar or brown sugar, a protein selected from eggs or egg whites, sodium caseinate, whey, wheat gluten, or the like, or other fruits, or antioxidants, or vitamins selected from Vitamins A, D, E (tocopherol), C (ascorbic acid), B1 (thiamine), B2 (riboflavin), B6, B12, and K, niacin, folic acid, biotin, or combinations thereof.

VI. EXAMPLES

Example 1

Peel Color

In one example, a non-destructive method was used to indicate the maturity (or state of ripening) of the bananas. The outside color of ripening bananas was measured using the Chiquita Color Chart shown in FIG. 1.

Example 2

Brix (%)

In another Example, the Soluble Solids Content, or Brix (%), was measured for ripening bananas. A handheld refractometer (Atago PAL-1 precision 0.1% Brix) was used for this measurement.

Example 3

Pulp Texture

In another example, the firmness of ripening bananas was measured in the center of the peeled banana using the Texture Analyzer TA.XT PLUS fitted with a 5-mm convex probe and 5-kg load cell. The probe was driven to a depth of 10 mm at a crosshead speed of 1 mm sec$^{-1}$. Data are recorded as the Bio-yield (g) generated during penetration of the banana pulp.

Results for Examples 1-3 are show in Tables 1-3.

Example 4

Analysis of Ripened Bananas

Pulp temperatures and internal cutting of fruit samples must be performed each day to verify that the fruit pulp and color are advancing to the desired shipping stages for the designated room.

In the pulp temperature will vary from 1.0 to 2.0 F above the set point temperature after the fruit has been gassed for 24 hours.

Although the foregoing invention has been described in some detail by way of illustration and example for purposes of clarity of understanding, one of skill in the art will appreciate that certain changes and modifications may be practiced within the scope of the appended claims. In addition, each patent, patent application, and publication provided herein is incorporated by reference in its entirety to the same extent as if each was individually incorporated by reference. Where a conflict exists between the instant application and a reference provided herein, the instant application shall dominate.

TABLE 1

Banana quality during the storage at 75° F.

| | 0 DAY AT 75° F. | | | 1 DAY AT 75° F. | | | 2 DAYS AT 75° F. | | | 3 DAY AT 75° F. | | |
|---|---|---|---|---|---|---|---|---|---|---|---|---|
| TREATMENTS | COLOR | BRIX (%) | FIRMNESS (g) | COLOR | BRIX (%) | FIRMNESS (g) | COLOR | BRIX (%) | FIRMNESS (g) | COLOR | BRIX (%) | FIRMNESS (g) |
| CONTROL | 3.3 | 13.1 | 232.9 | 4.3 | 16.6 | 186.4 | 4.7 | 18.8 | 188.5 | 6.6 | 20.3 | 174.3 |
| FSR | 3.7 | 18.1 | 229.3 | 4.5 | 21.0 | 219.8 | 5.7 | 22.6 | 206.5 | 6.9 | 23.1 | 184.5 |

* Control is green banana with 5 days ripening process. [specify what the control conditions are]

TABLE 2

Quality of banana with FSR Process during the storage at 75° F.

| | 0 DAY AT 75° F. | | | 1 DAY AT 75° F. | | | 2 DAYS AT 75° F. | | | 3 DAY AT 75° F. | | |
|---|---|---|---|---|---|---|---|---|---|---|---|---|
| TESTS | COLOR | BRIX (%) | FIRMNESS (g) | COLOR | BRIX (%) | FIRMNESS (g) | COLOR | BRIX (%) | FIRMNESS (g) | COLOR | BRIX (%) | FIRMNESS (g) |
| TEST 1 | | | | 4.4 | 18.4 | 236.0 | 6.0 | 23.3 | 232.6 | | | |
| TEST 2 | | | | 4.3 | 17.1 | 269.4 | 5.6 | 22.0 | 261.9 | 6.7 | 23.9 | 221.8 |
| TEST 3 | | | | 5.0 | 18.6 | 230.7 | 6.0 | 23.3 | 231.1 | | | |
| TEST 4 | | | | | | | 5.7 | 21.9 | 225.7 | 6.2 | 23.8 | 207.7 |
| TEST 5 | 3.3 | 18.3 | 230.3 | | | | 5.0 | 21.9 | 224.0 | 6.3 | 24.1 | 223.2 |
| TEST 6 | | | | 4.1 | 18.4 | 215.0 | 5.5 | 20.3 | 221.7 | 6.0 | 21.4 | 217.1 |
| TEST 7 | 3.4 | 17.0 | 265.8 | 4.7 | 18.5 | 209.7 | | | | 6.0 | 23.2 | 216.5 |
| TEST 8 | | | | 4.6 | 18.0 | 230.6 | 5.9 | 21.9 | 220.1 | 6.1 | 23.0 | 231.7 |
| TEST 9 | 3.2 | 18.9 | 267.5 | 4.8 | 21.4 | 219.9 | | | | 6.3 | 24.0 | 218.4 |
| TEST 10 | 3.8 | 20.0 | 247.4 | | | | 5.8 | 23.3 | 225.8 | 6.2 | 24.1 | 224.6 |
| TEST 11 | | | | 4.5 | 19.2 | 229.9 | 5.8 | 23.5 | 225.8 | | | |

TABLE 3

Banana Color Development after Ripening Process

| Test Boxes | After 2 days FSR Process | After 2 days FSR Process + 1 day at 57 F. |
|---|---|---|
| 240 | 2.8 | 3.2 |
| 240 | 2.5 | 3 |
| 240 | 3 | 3.2 |
| 1920 | 2.7 | 3.2 |

* After 5 days regular ripening process, green banana (control) reached the color stage 2.5-3.0.

What is claimed is:

1. A method for accelerating the ripening of unripe bananas, wherein the unripe bananas are not ripened more than to color stage 1 and wherein the unripe bananas are ripened to color stage 3.0 to 3.5, the method comprising the following steps:
    a. exposing the unripe bananas for about 24 hours to exogenous ethylene gas by flowing treatment air containing the exogenous ethylene gas over the surface of the bananas, wherein:
        i. the average ethylene concentration in the treatment air is between about 150 parts per million and about 600 parts per million; and
        ii the treatment air temperature is maintained between about 70° F. (21° C.) and about 80° F. (27° C.);

b. ending the exposing by ventilating the bananas with forced air at an air temperature of about 50° F. (10° C.) to about 80° F. (27° C.);
c. storing the bananas in air at an air temperature of about 50° F. (10° C.) to about 60° F. (16° C.) for about 24 hours or until the bananas have reached a color stage of 2.5 to 3.0;
d. ventilating the stored bananas with forced air at an air temperature of about 50° F. (10° C.) to about 80° F. (27° C.) to reduce the concentration of $CO_2$ in the treatment air to no more than about 5%; and
e. storing the bananas in a controlled air temperature of about 50° F. (10° C.) to about 60° F. (16° C.) for about 24 hours or until the bananas have reached a color stage of 3.0 to 3.5;
thereby accelerating the ripening of the bananas to color stage 3.0 to 3.5.

2. The method of claim 1, comprising the step of maintaining a static pressure of at least about 45 to about 55 Pa ($N/m^2$).

3. The method of claim 1, comprising the step of maintaining a static pressure of at least about 0.18 to about 0.22 inches of water.

4. The method of claim 1, wherein the average ethylene concentration in step (a)(i) is between about 250 parts per million and about 500 parts per million.

5. The method of claim 1, wherein the average ethylene concentration in step (a)(i) is between about 200 parts per million and about 400 parts per million.

6. The method of claim 1, wherein the temperature in step (a)(ii) is about 75° F. (24° C.).

7. The method of claim 1, wherein the temperature in steps (c) and (e) is about 57° F. (14° C.).

8. The method of claim 1, wherein the internal temperature of a ripening banana in steps (c) and (e) is about 57° F. (14° C.).

9. The method of claim 1, wherein the ventilating in either steps (b) or (d) reduces the concentration of $CO_2$ in the air and also increases the concentration of $O_2$ in the air about the bananas.

10. The method of claim 1, wherein the ventilating in either steps (b) or (d) reduces the concentration of $CO_2$ in the air to no more than about 5% in the air about the bananas.

11. The method of claim 1, wherein the ventilating in either steps (b) or (d) reduces the concentration of $CO_2$ in the air to less than about 5% in the air about the bananas.

12. The method of claim 1, wherein the ventilating in either steps (b) or (d) is performed for about 30 to about 90 minutes.

13. The method of claim 12, wherein the ventilating in either steps (b) or (d) is performed for about 45 to about 60 minutes.

14. The method of claim 1, wherein the bananas are in banana boxes.

15. The method of claim 14, wherein the banana boxes are on pallets.

16. The method of claim 15, comprising the step of arranging the pallets to promote air to flow through the banana boxes.

17. The method of claim 1, wherein the type of banana is selected from the group consisting of baby, manzano, burro, plantain, red, apple banana, Cavendish, lady finger, pisang, williams, and cooking.

* * * * *